(12) United States Patent
Muto et al.

(10) Patent No.: US 9,748,851 B2
(45) Date of Patent: Aug. 29, 2017

(54) SWITCHING POWER SUPPLY APPARATUS WITH SNUBBER CIRCUIT

(71) Applicant: Murata Manufacturing Co., Ltd., Nagaokakyo-shi, Kyoto-fu (JP)

(72) Inventors: Takami Muto, Nagaokakyo (JP); Tadahiko Matsumoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 48 days.

(21) Appl. No.: 14/881,230

(22) Filed: Oct. 13, 2015

(65) Prior Publication Data

US 2016/0036337 A1    Feb. 4, 2016

Related U.S. Application Data

(63) Continuation of application No. PCT/JP2014/063151, filed on May 19, 2014.

(30) Foreign Application Priority Data

May 21, 2013    (JP) .................................. 2013-107110

(51) Int. Cl.
  *H02M 3/335*    (2006.01)
  *H02M 1/34*    (2007.01)
(52) U.S. Cl.
  CPC ......... *H02M 3/33546* (2013.01); *H02M 1/34* (2013.01); *H02M 3/33576* (2013.01)
(58) Field of Classification Search
  CPC . H02M 3/33546; H02M 1/34; H02M 3/33576
  (Continued)

(56) References Cited

U.S. PATENT DOCUMENTS 5,862,043 A * 1/1999 Youn .................... H02M 1/4258
                                                363/131
5,907,481 A * 5/1999 Svardsjo ........... H02M 3/33592
                                                363/126

(Continued)

FOREIGN PATENT DOCUMENTS

JP      01-202161 A     8/1989
JP      2012-213260 A   11/2012
JP      2012-249351 A   12/2012

OTHER PUBLICATIONS

Received search report from STIC EIC 2800 searcher John DiGeronimo on Sep. 28, 2016.*

(Continued)

*Primary Examiner* — Timothy J Dole
*Assistant Examiner* — Htet Z Kyaw
(74) *Attorney, Agent, or Firm* — Keating & Bennett, LLP

(57) ABSTRACT

A switching power supply apparatus includes a first series circuit including a third rectifier device and a fourth rectifier device and that is connected between a positive output terminal and a negative output terminal, and a first capacitor a first end of which is connected to a connection node between the third rectifier device and the fourth rectifier device and a second end of which is connected to an end, not connected to the first series circuit, of a first rectifier device or a second rectifier device. The first series circuit and the first capacitor define a snubber circuit.

16 Claims, 7 Drawing Sheets

(58) Field of Classification Search
USPC .......................................... 363/21.02–21.18
See application file for complete search history.

(56) References Cited

U.S. PATENT DOCUMENTS

| | | | | |
|---|---|---|---|---|
| 6,064,580 | A * | 5/2000 | Watanabe | H02M 3/33592 363/127 |
| 6,108,218 | A * | 8/2000 | Igarashi | H02M 1/4258 363/21.16 |
| 6,498,735 | B2 * | 12/2002 | Hosotani | H02M 3/3385 363/134 |
| 6,650,552 | B2 * | 11/2003 | Takagi | H02M 3/33592 323/266 |
| 6,771,521 | B1 * | 8/2004 | Xiong | H02M 1/34 363/21.06 |
| 6,778,410 | B2 * | 8/2004 | Zeng | H02M 3/33592 363/16 |
| 7,177,163 | B2 * | 2/2007 | Eguchi | H02M 3/33592 363/132 |
| 7,218,534 | B2 * | 5/2007 | Yasumura | H01F 30/04 363/21.02 |
| 7,400,519 | B2 * | 7/2008 | Yoshida | H02M 3/33592 363/127 |
| 7,596,009 | B2 * | 9/2009 | Matsumoto | H02M 3/33592 363/127 |
| 8,929,103 | B2 * | 1/2015 | Brkovic | H01F 27/38 363/21.14 |
| 9,240,698 | B2 * | 1/2016 | Lee | H02M 1/34 |
| 2002/0044459 | A1 * | 4/2002 | Tsubota | H02M 1/34 363/16 |
| 2002/0101742 | A1 * | 8/2002 | Hosotani | H02M 3/3382 363/17 |
| 2012/0249059 | A1 | 10/2012 | Matsumae et al. | |
| 2012/0300501 | A1 * | 11/2012 | Kojima | H02M 3/33576 363/17 |
| 2013/0300210 | A1 * | 11/2013 | Hosotani | H02J 5/005 307/104 |

OTHER PUBLICATIONS

Official Communication issued in International Patent Application No. PCT/JP2014/063151, mailed on Jul. 29, 2014.

* cited by examiner (1)

(2)

(1)

(2)

SWITCHING POWER SUPPLY APPARATUS WITH SNUBBER CIRCUIT

BACKGROUND OF THE INVENTION

1. Field of the Invention

The present invention relates to a switching power supply apparatus including a switching device on a primary side of a transformer and an inductor and a rectifier device on a secondary side of the transformer.

2. Description of the Related Art

In an existing switching power supply apparatus, a snubber circuit is connected in parallel with a switching device to suppress the peak of a surge voltage generated at the time of on/off switching of a rectifier device. For example, Japanese Unexamined Patent Application Publication No. 1-202161 discloses an example in which a commutation diode is provided with a snubber circuit.

FIG. 11 is a diagram illustrating an example of a secondary side circuit of a switching power supply apparatus including a snubber circuit, disclosed in Japanese Unexamined Patent Application Publication No. 1-202161. In the example illustrated in FIG. 11, a secondary circuit including a rectifier diode Da, a commutation diode Db, an inductor Lo, and an output capacitor Co is formed on the secondary side of a transformer. An RC snubber circuit formed of a series circuit of a capacitor C and a resistor R is connected between the two ends of the commutation diode Db.

With this configuration, when the commutation diode Db is turned off, surge energy generated between the two ends of the commutation diode Db is consumed by the RC snubber circuit and, hence, the peak value of a surge voltage is suppressed.

In an RC snubber circuit such as the one illustrated in FIG. 11, surge voltage energy is consumed by the resistor R and, hence, loss is naturally generated in the snubber circuit. As a result, provision of the RC snubber circuit causes the efficiency of the switching power supply apparatus to be decreased.

Japanese Unexamined Patent Application Publication No. 1-202161 also discloses an active snubber circuit in which, in order to solve the problem of the snubber circuit described above, without using the resistor R, a transistor is turned on at the timing at which a surge voltage is generated in the rectifier circuit and the surge voltage energy is released after having been stored in the capacitor. However, in such an active snubber circuit, although the surge voltage energy can be regenerated, there is a problem in that the whole circuit configuration becomes complicated and, hence, an area of a substrate occupied by the circuit is increased.

SUMMARY OF THE INVENTION

Preferred embodiments of the present invention provide a switching power supply apparatus which, although having a simple circuit configuration, allows power conversion efficiency to be increased by avoiding loss due to consumption of surge voltage energy in a snubber circuit.

A switching power supply apparatus according to a preferred embodiment of the present invention includes a transformer including a primary winding and a secondary winding; a primary side circuit that is connected to the primary winding and that includes a switching device intermittently applying a DC voltage to the primary winding; and a secondary side circuit that includes an inductor connected in series with a current path between a positive output terminal or a negative output terminal and the secondary winding and a first rectifier device and a second rectifier device that rectify a current flowing through the secondary winding and the inductor.

The switching power supply apparatus further includes a first series circuit that includes a third rectifier device and a fourth rectifier device and that is connected between the positive output terminal and the negative output terminal; and a first capacitor a first end of which is connected to a connection node between the third rectifier device and the fourth rectifier device and a second end of which is connected to an end, not connected to the first series circuit, of the first rectifier device or the second rectifier device.

The first series circuit and the first capacitor define a snubber circuit.

With the configuration described above, in the snubber circuit including a capacitor and rectifier devices, surge voltages generated between the two ends of the first and second rectifier devices are stored as electric energy, and the energy stored in this capacitor is regenerated at the on times of the first and second rectifier devices and, hence, loss due to provision of the snubber circuit is reduced.

For example, the first rectifier device preferably is a rectifier device (rectification side rectifier device) connected in series with the secondary winding of the transformer, and the second rectifier device preferably is a rectifier device (commutation side rectifier device) connected in parallel with the secondary winding. The second end of the first capacitor is connected to a connection node between the first rectifier device and the secondary winding. With this configuration, a forward circuit is provided on the secondary side of the transformer, and surge voltage energy generated at the turn-off time of the first rectifier device is regenerated.

For example, the first rectifier device preferably is a rectifier device connected in series with the secondary winding of the transformer and the second rectifier device preferably is a rectifier device connected in parallel with the secondary winding. The second end of the first capacitor is connected to a connection node between the second rectifier device and the inductor. With this configuration, a forward circuit is provided on the secondary side of the transformer and surge voltage energy generated at the turn-off time of the second rectifier device is regenerated.

Preferably, the switching device includes a low-side switching device and a high-side switching device that are alternately switched on/off, the secondary winding includes a first secondary winding and a second secondary winding connected in series with each other, the inductor is connected between a connection node between the first secondary winding and the second secondary winding and the positive output terminal or the negative output terminal, the first rectifier device is connected in series with the first secondary winding, and the second rectifier device is connected in series with the second secondary winding. Preferably, the switching power supply apparatus further includes a second series circuit that is connected between the positive output terminal and the negative output terminal and that includes a fifth rectifier device and a sixth rectifier device, and a second capacitor one end of which is connected to a connection node between the fifth rectifier device and the sixth rectifier device and a second end of which is connected to a connection node between the second rectifier device and the second secondary winding. Preferably, the second series circuit and the second capacitor define another snubber circuit.

With the configuration described above, a center-tap secondary side circuit is provided on the secondary side of the transformer. This secondary side circuit has a larger leakage inductor component of the transformer than the forward circuit described above and, hence, the energy of a generated surge voltage is increased, resulting in a high loss reduction effect obtained by energy regeneration in the snubber circuit.

For example, the first rectifier device and the second rectifier device preferably are MOS-FETs including a body diode or rectifier devices having characteristics corresponding to MOS-FETs.

According to various preferred embodiments of the present invention, a surge voltage generated between the two ends of each of the first and second rectifier devices is stored as electric energy in a snubber circuit defined by a capacitor and a rectifier device, and the energy stored in the capacitor is regenerated at the on times of the rectifier devices. Hence, consumption of surge voltage energy is avoided, resulting in a reduction in loss.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described by using a number of specific examples. The preferred embodiments are examples and, further, partial replacement or combination of the configurations illustrated in the different preferred embodiments will allow other preferred embodiments to be realized.

First Preferred Embodiment

Figure 1:
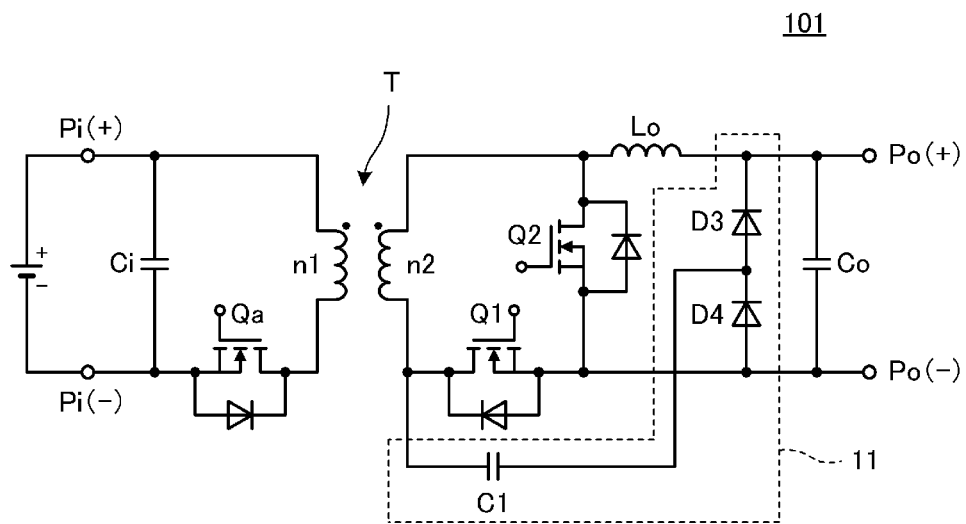
FIG. 1 is a circuit diagram of a switching power supply apparatus 101 according to a first preferred embodiment of the present invention.
Figure 2:
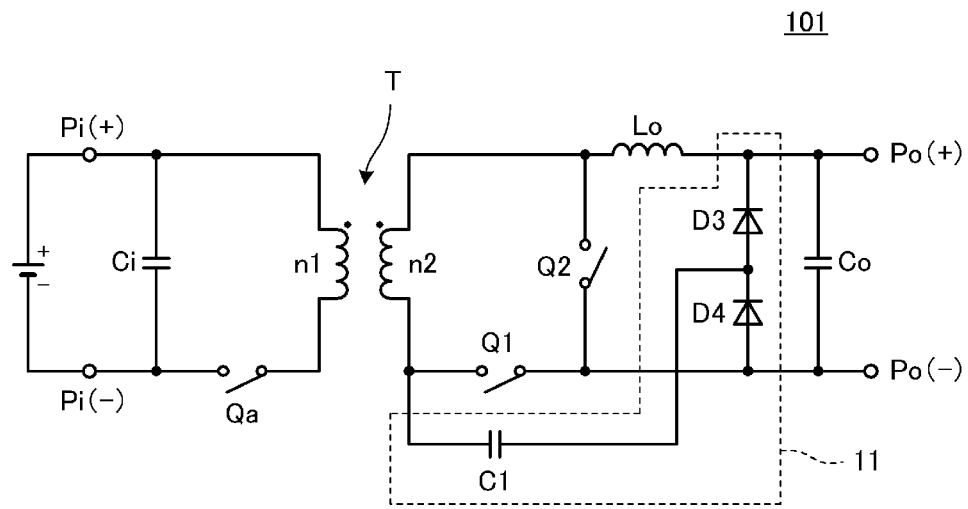
FIG. 2 is a circuit diagram in which the switching devices in FIG. 1 are represented by switch symbols.

FIG. 1 is a circuit diagram of a switching power supply apparatus 101 according to a first preferred embodiment of the present invention. FIG. 2 is a circuit diagram in which the switching devices in FIG. 1 are represented by switch symbols. The switching power supply apparatus 101 includes a primary side circuit and a secondary side circuit. The primary side circuit includes a transformer T including a primary winding n1 and a secondary winding n2 and a switching device Qa that is connected to the primary winding n1 and that intermittently provides the primary winding n1 with a DC voltage. The secondary side circuit includes an inductor (choke coil) Lo connected between the secondary winding n2 and an output terminal Po(+) and a first rectifier device Q1 and a second rectifier device Q2 that rectify a current flowing through the secondary winding n2 and the inductor Lo. The first rectifier device Q1 is a rectifier device on the rectifying side and the second rectifier device Q2 is a rectifier device on the commutation side. In this way, a forward converter circuit is provided. Note that a DC power supply is connected between a positive input terminal Pi(+) and a negative input terminal Pi(−). The inductor (choke coil) Lo need only be connected in series with a current path between the positive output terminal Po(+) or a negative output terminal Po(−) and the secondary winding n2. Hence, the inductor Lo may be connected between the source of the first rectifier device Q1 and the output terminal Po(−). This is also the case with other preferred embodiments described later.

An input capacitor Ci is connected between the positive input terminal Pi(+) and the negative input terminal Pi(−) of the primary side circuit. An output capacitor Co is connected between the positive output terminal Po(+) and the negative output terminal Po(−) of the secondary side circuit.

A first series circuit including a third rectifier device D3 and a fourth rectifier device D4 is connected between the positive output terminal Po(+) and the negative output terminal Po(−) of the secondary circuit. A first end of a first capacitor C1 is connected to a connection node between the third rectifier device D3 and the fourth rectifier device D4, and a second end of the first capacitor C1 is connected to a connection node between the first rectifier device Q1 and the secondary winding n2. The first capacitor C1, the third rectifier device D3, and the fourth rectifier device D4 define a snubber circuit 11.

Each of the switching device Qa, the first rectifier device Q1, and the second rectifier device Q2 preferably is a MOS-FET and includes a body diode (parasitic diode) between the drain and source. A switching control circuit (not shown) is connected between the gate and source of the switching device Qa. The first rectifier device Q1 is turned on at the time when the switching device Qa on the primary side is turned on. The second rectifier device Q2 is turned on at the time when the switching device Qa on the primary side is turned off. For this purpose, for example, the gate of the first rectifier device Q1 is connected to the secondary winding n2 and the gate of the second rectifier device Q2 is connected to the secondary winding n2.

Figure 3:
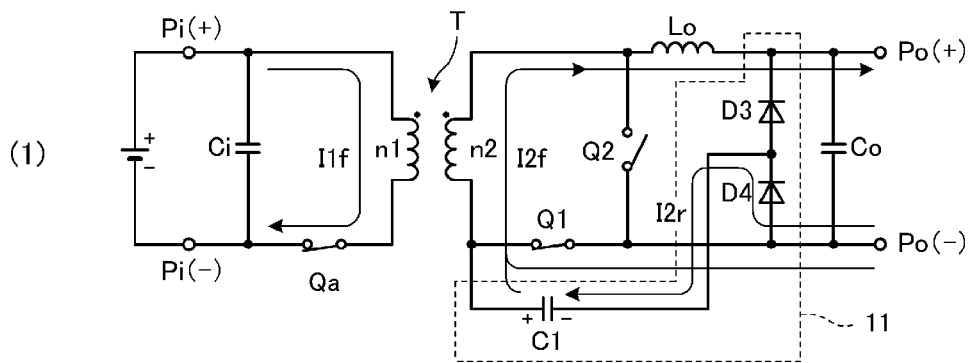
FIG. 3 is a diagram illustrating, for example, currents that flow in each state of the switching power supply apparatus 101.
Figure 3:
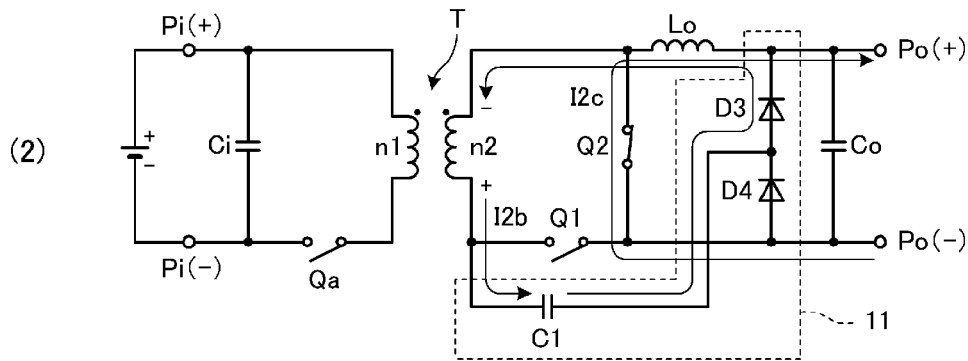

FIG. 3 is a diagram illustrating, for example, currents that flow in each state of the switching power supply apparatus 101. The operation of the switching power supply apparatus 101 is as follows.

(1) First, when the switching device Qa and the first rectifier device Q1 are turned on, as illustrated in state (1) in FIG. 3, a current I1$f$ flows through the primary winding n1 of the transformer T, and a current I2$f$ flows through the secondary winding n2. The current I2$f$ causes energy to be stored in the inductor Lo.

As described later, surge voltage energy has been stored in the first capacitor C1 and, hence, a current I2$r$ flows through a path: the first capacitor C1 → the secondary winding n2 → the inductor Lo → a load → the fourth rectifier device D4 → the first capacitor C1. As a result, the surge voltage energy once stored in the first capacitor C1 is regenerated.

(2) Next, when the switching device Qa and the first rectifier device Q1 are turned off, as illustrated in state (2) of FIG. 3, a surge due to a reverse electromotive force of the parasitic inductance of the circuit is generated. In more detail, a current flows in the reverse direction during a reverse recovery time (recovery time) of the body diode of Q1, and a surge is generated right after the end of this reverse recovery time. Due to this surge voltage, a current I2b flows through a path: the secondary winding n2 → the first capacitor C1 → the third rectifier device D3 → the inductor Lo → the secondary winding n2. As a result, surge voltage energy is stored in the first capacitor C1.

When the second rectifier device Q2 is turned on, a current I2c flows (is commutated) through the second rectifier device Q2 due to the energy stored in the inductor Lo, as illustrated by state (2) in FIG. 3.

Then the circuit goes back to state (1), if necessary after a dead time has passed in which all of the switching device Qa, the first rectifier device Q1, and the second rectifier device Q2 enter an off state.

Hereafter, states (1) and (2) are repeated.

In this way, surge energy generated in the secondary winding n2 at the turn-off time of the first rectifier device Q1 is absorbed by the snubber circuit 11, and the energy is regenerated later.

Second Preferred Embodiment

Figure 4:
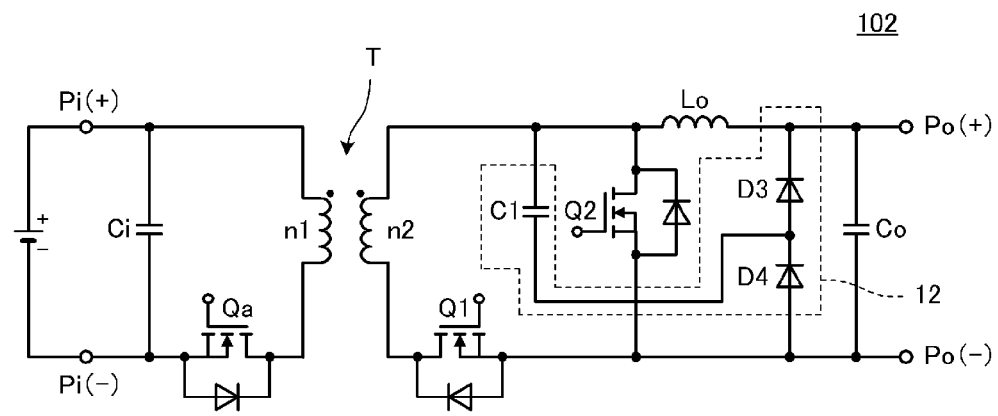
FIG. 4 is a circuit diagram of a switching power supply apparatus 102 according to a second preferred embodiment of the present invention.
Figure 5:
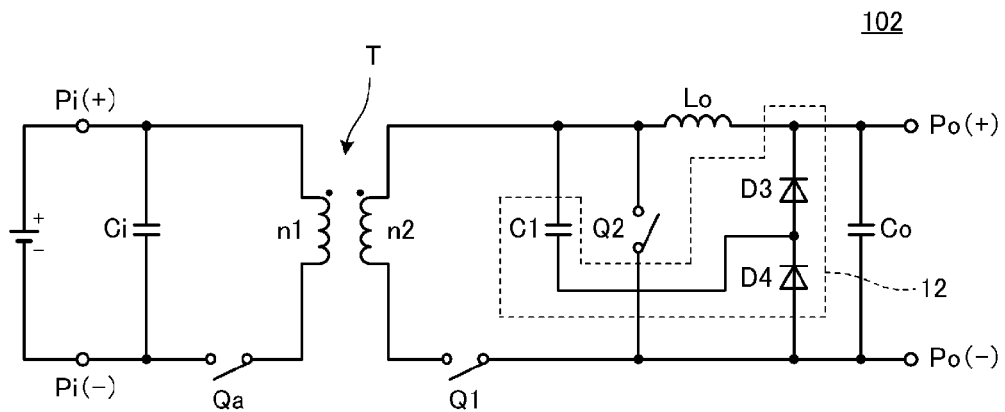
FIG. 5 is a circuit diagram in which the switching devices in FIG. 4 are represented by switch symbols.

FIG. 4 is a circuit diagram of a switching power supply apparatus 102 according to a second preferred embodiment of the present invention. FIG. 5 is a circuit diagram in which the switching devices in FIG. 4 are represented by switch symbols. The switching power supply apparatus 102 includes a primary side circuit and a secondary side circuit. The primary side circuit includes a transformer including a primary winding n1 and a secondary winding n2 and a switching device Qa that is connected to the primary winding n1 and that intermittently provides the primary winding n1 with a DC voltage. The secondary side circuit includes an inductor (choke coil) Lo connected between the secondary winding n2 and an output terminal Po(+) and a first rectifier device Q1 and a second rectifier device Q2 that rectify a current flowing through the secondary winding n2 and the inductor Lo. The first rectifier device Q1 is a rectifier device on the rectifying side and the second rectifier device Q2 is a rectifier device on the commutation side.

The position at which the first capacitor C1 is connected is different from that in the switching power supply apparatus 101 illustrated in FIG. 1 and FIG. 2 of the first preferred embodiment. In the switching power supply apparatus 102 of the second preferred embodiment, a first end of the first capacitor C1 is connected to a connection node between the third rectifier device D3 and the fourth rectifier device D4, and a second end of the first capacitor C1 is connected to a connection node between the second rectifier device Q2 and the secondary winding n2. The rest of the configuration is preferably the same or substantially the same as that of the switching power supply apparatus 101 illustrated in FIG. 1 and FIG. 2.

Figure 6:
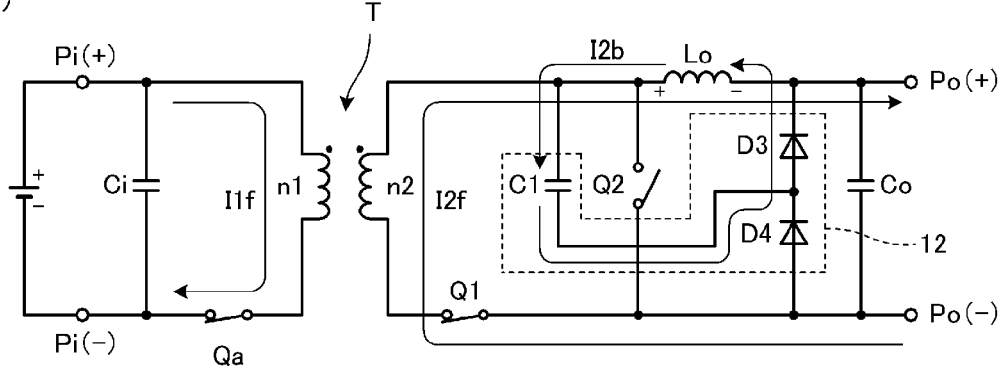
FIG. 6 is a diagram illustrating, for example, currents that flow in each state of the switching power supply apparatus 102.
Figure 6:
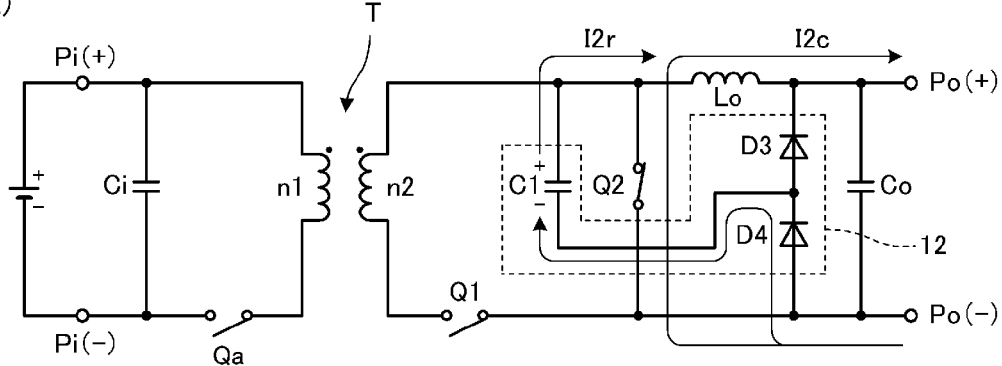

FIG. 6 is a diagram illustrating, for example, currents that flow in each state of the switching power supply apparatus 102. The operation of the switching power supply apparatus 102 is as follows.

(1) First, when the switching device Qa and the first rectifier device Q1 are turned on, as illustrated in state (1) in FIG. 6, a current I1f flows through the primary winding n1 of a transformer T, and a current I2f flows through the secondary winding n2. The current I2f causes energy to be stored in the inductor Lo.

As a result of the second rectifier device Q2 being turned off, a surge is generated due to the parasitic inductance of the circuit and the reverse recovery characteristics of the body diode of the second rectifier device Q2. Hence, a current I2b flows through a path: the inductor Lo → the first capacitor C1 → the third rectifier device D3 → the inductor Lo. As a result, surge voltage energy is stored in the first capacitor C1.

(2) Then, when the switching device Qa and the first rectifier device Q1 are turned off, as illustrated in state (2) of FIG. 6, a current I2r flows through a path: the first capacitor C1 → the inductor Lo → a load → the fourth rectifier device D4 → the first capacitor C1. As a result, the surge voltage energy once stored in the first capacitor C1 is regenerated. Further, as a result of the second rectifier device Q2 being turned on, a current I2c flows (is commutated) through the second rectifier device Q2 due to the energy stored in the inductor Lo.

Then the circuit goes back to state (1), if necessary after a dead time has passed in which all of the switching device Qa, the first rectifier device Q1, and the second rectifier device Q2 enter an off state.

Hereafter, states (1) and (2) are repeated.

In this way, surge energy generated at the turn-off time of the second rectifier device Q2 is absorbed by a snubber circuit 12, and the energy is regenerated later.

Third Preferred Embodiment

Figure 7:
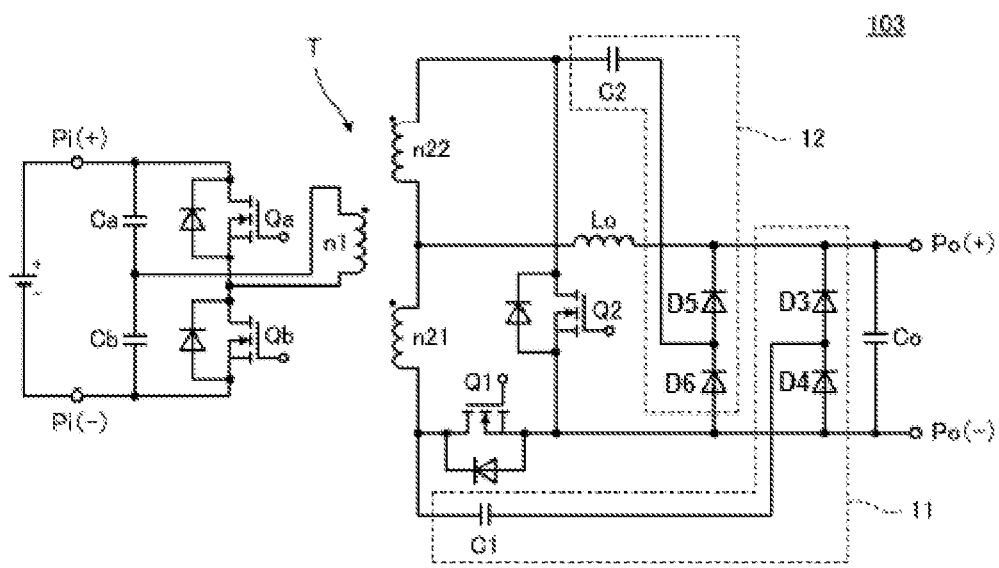
FIG. 7 is a circuit diagram of a switching power supply apparatus 103 according to a third preferred embodiment of the present invention.
Figure 8:
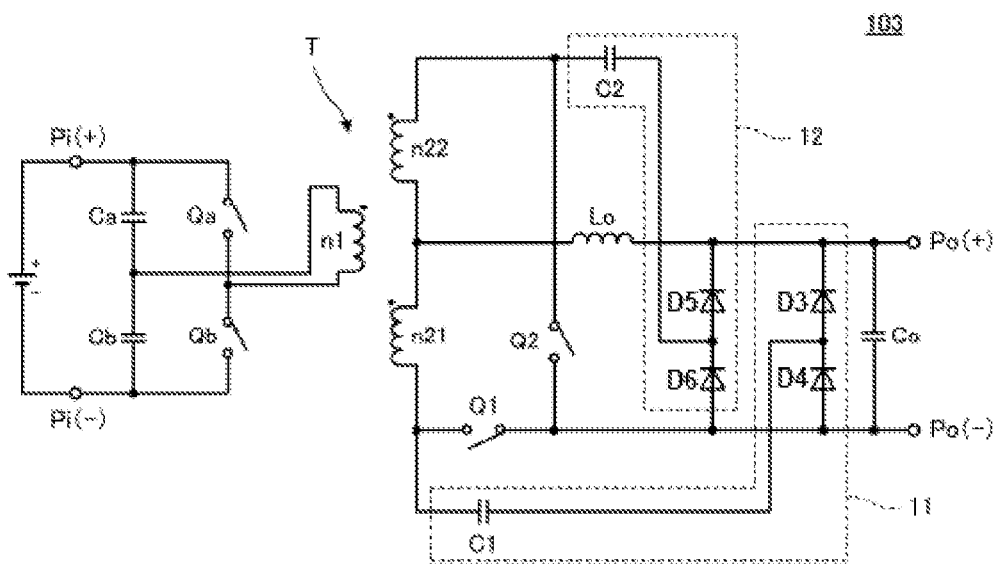
FIG. 8 is a circuit diagram in which the switching devices in FIG. 7 are represented by switch symbols.

FIG. 7 is a circuit diagram of a switching power supply apparatus 103 according to a third preferred embodiment of the present invention. FIG. 8 is a circuit diagram in which the switching devices in FIG. 7 are represented by switch symbols. The switching power supply apparatus 103 includes a transformer T including a primary winding n1 and secondary windings n21 and n22, a primary side circuit connected to the primary winding n1, and a secondary side circuit connected to the secondary windings n21 and n22.

The primary side circuit includes a series circuit of a high-side switching device Qa and a low-side switching device Qb and a series circuit of capacitors Ca and Cb, and these are connected between input terminals Pi(+) and Pi(−). The primary winding n1 of the transformer T is connected between a connection node between the switching devices Qa and Qb and a connection node between the capacitors Ca and Cb.

The secondary side circuit includes a first rectifier device Q1, a second rectifier device Q2, an inductor Lo, a third rectifier device D3, a fourth rectifier device D4, a fifth rectifier device D5, a sixth rectifier device D6, a first capacitor C1, and a second capacitor C2.

The inductor Lo is connected between a connection node between the first secondary winding n21 and the second secondary winding n22 and an output terminal Po(+). The first rectifier device Q1 is connected in series with the first secondary winding n21, and the second rectifier device Q2 is connected in series with the second secondary winding n22. In this way, a half-bridge converter circuit is provided.

The third rectifier device D3 and the fourth rectifier device D4 define a first series circuit and this first series circuit is connected between a positive output terminal Po(+) and a negative output terminal Po(−). Similarly, the fifth rectifier device D5 and the sixth rectifier device D6 define a second series circuit and this second series circuit is connected between the positive output terminal Po(+) and the negative output terminal Po(−).

A first end of the first capacitor C1 is connected to a connection node between the fifth rectifier device D5 and the sixth rectifier device D6, and a second end of the first capacitor C1 is connected to a connection node between the first rectifier device Q1 and the first secondary winding n21. A first end of the second capacitor C2 is connected to a connection node between the third rectifier device D3 and the fourth rectifier device D4, and a second end of the second capacitor C2 is connected to a connection node between the second rectifier device Q2 and the second secondary winding n22.

Figure 9:
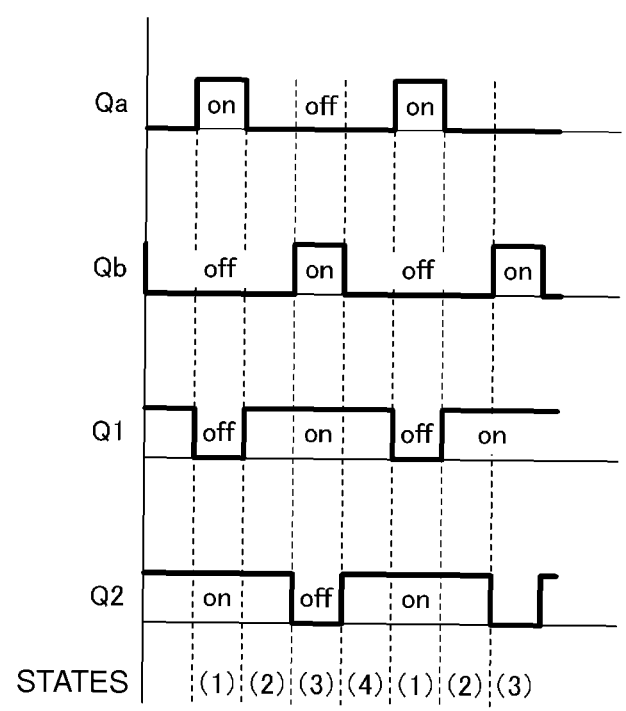
FIG. 9 illustrates a waveform diagram for each portion of the switching power supply apparatus 103 illustrated in FIG. 7 and FIG. 8.
Figure 10:
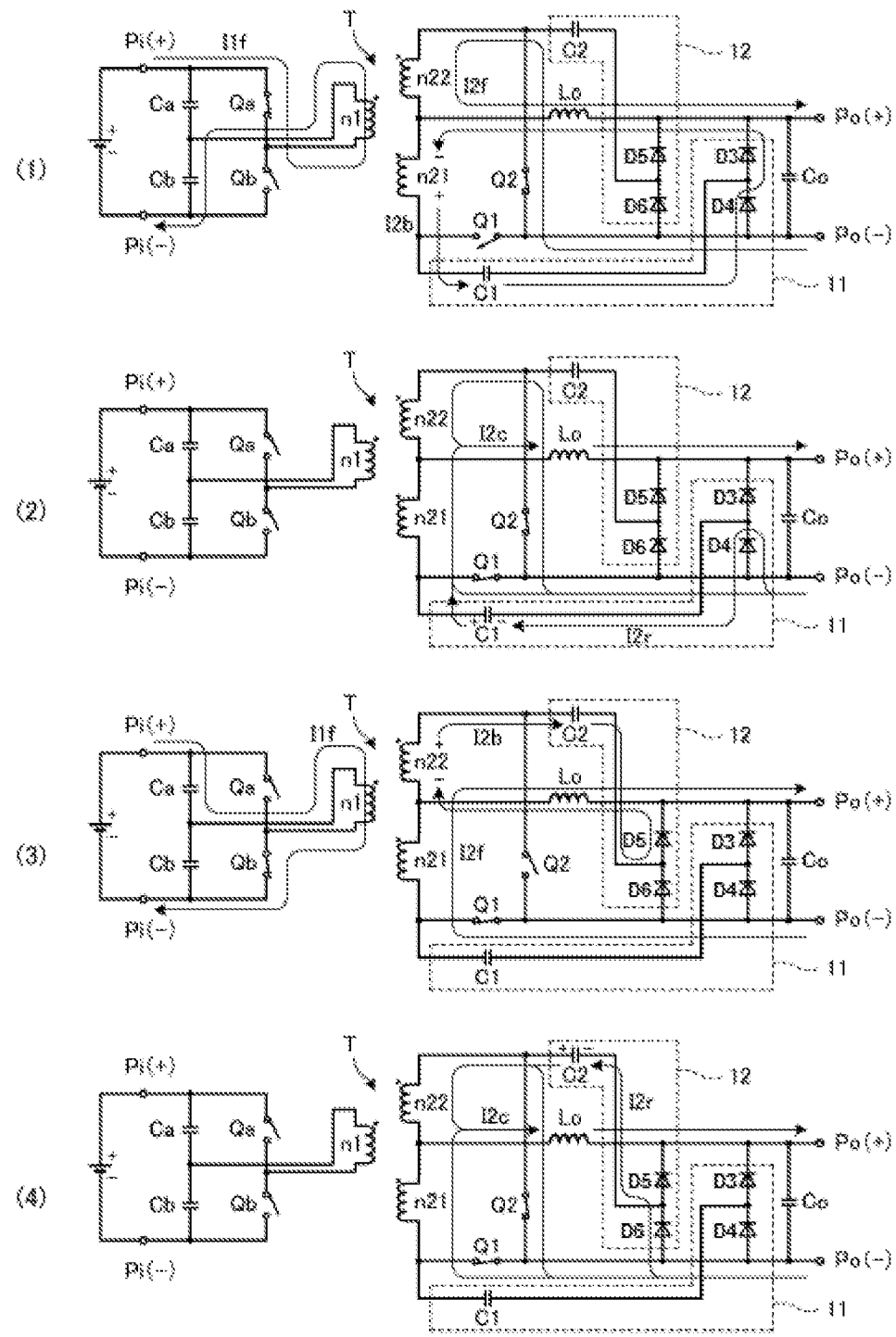
FIG. 10 is a diagram illustrating, for example, currents that flow in each state of the switching power supply apparatus 103.
Figure 11:
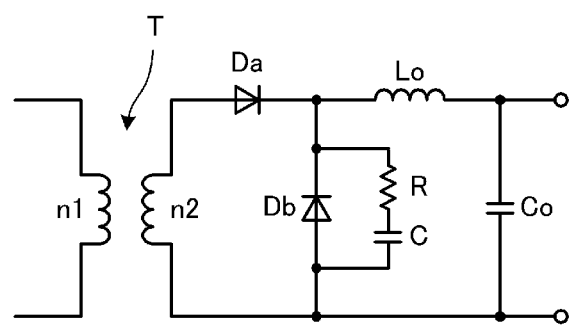
FIG. 11 is a diagram illustrating an example of a secondary side circuit of a switching power supply apparatus including a snubber circuit, disclosed in Japanese Unexamined Patent Application Publication No. 1-202161.

FIG. 9 illustrates a waveform diagram for each portion of the switching power supply apparatus 103 illustrated in FIG. 7 and FIG. 8. FIG. 10 is a diagram illustrating currents that flow in each state of the switching power supply apparatus 103. The operation of the switching power supply apparatus 103 is as follows.

(1) First, the first rectifier device Q1 is turned off and, as a result of the switching device Qa and the second rectifier device Q2 being turned on, a current I1$f$ flows through the primary winding n1 of the transformer T and a current I2$f$ flows through the secondary winding n22 as illustrated in state (1) of FIG. 10. The current I2$f$ causes energy to be stored in the inductor Lo. As described later, a surge due to a reverse electromotive force of a parasitic inductance of the circuit is generated as a result of the first rectifier device Q1 being turned off by transition from state (4) to state (1). Hence, a current I2$b$ flows through a path: the secondary winding n21 → the first capacitor C1 → the fifth rectifier device D5 → the inductor Lo → the secondary winding n21. As a result, surge voltage energy is stored in the first capacitor C1.

(2) Next, when the switching device Qa is turned off and the first rectifier device Q1 is turned on, as illustrated in state (2) of FIG. 10, due to the energy stored in the inductor Lo, a current I2$c$ flows through the secondary windings n21 and n22 via the first rectifier device Q1 and the second rectifier device Q2. Further, a current I2$r$ flows through a path: the first capacitor C1 → the secondary winding n21 → the inductor Lo → a load → the sixth rectifier device D6 → the first capacitor C1. As a result, surge energy once stored in the first capacitor C1 is regenerated.

(3) Then, when the switching device Qb is turned on and the second rectifier device Q2 is turned off, the current I1$f$ flows through the primary winding n1 of the transformer T and the current I2$f$ flows through the secondary winding n21, as illustrated in state (3) of FIG. 10. The current I2$f$ causes energy to be stored in the inductor Lo. Further, a surge due to the reverse electromotive force of the secondary winding n22 is generated as a result of the second rectifier device Q2 having been turned off. Hence, a current I2$b$ flows through a path: the secondary winding n22 → the second capacitor C2 → the third rectifier device D3 → the inductor Lo → the secondary winding n22. As a result, surge voltage energy is stored in the second capacitor C2.

(4) Then, when the switching device Qb is turned off and the second rectifier device Q2 is turned on, as illustrated by (4) of FIG. 10, the current I2$c$ flows through the secondary windings n21 and n22 via the first rectifier device Q1 and the second rectifier device Q2 due to the energy stored in the inductor Lo. Further, the current I2$r$ flows through a path: the second capacitor C2 → the secondary winding n22 → the inductor Lo → the load → the fourth rectifier device D4 → the second capacitor C2. As a result, the surge voltage energy once stored in the second capacitor C2 is regenerated.

Hereafter, the states (1)-(4) described above are repeated.

In this way, surge energy generated in the secondary winding n21 at the turn-off time of the first rectifier device Q1 is absorbed by the snubber circuit 11 and, right after this, the energy is regenerated. Further, surge energy generated at the turn-off time of the second rectifier device Q2 is absorbed by the snubber circuit 12 and, right after this, the energy is regenerated.

As described above in the three preferred embodiments, although the snubbers have different configurations in accordance with the connection structures (topologies) of the secondary side circuits of the transformer of the switching power supplies, the snubbers have a common feature characterized in that a series circuit including the two rectifier devices (D3 and D4) or (D5 and D6) connected between the positive output terminal and the negative output terminal is provided and that the capacitor (C1) or (C2) one end of which is connected to a connection node between the two rectifier devices and the other end of which is connected to an end of the first rectifier device (Q1) or the second rectifier device (Q2) not connected to the series circuit described above.

Note that the third rectifier device D3, the fourth rectifier device D4, the fifth rectifier device D5, and the sixth rectifier device D6 are each preferably defined by a diode; however, these devices may be each defined by a switching device such as a MOS-FET.

Further, in the preferred embodiments described above, a configuration in which the first rectifier device Q1 and the second rectifier device Q2 are defined by MOS-FETs and synchronous rectification is performed by switching them in synchronization with the switching of the primary side circuit is preferably provided. However, a configuration in which rectifier devices having characteristics corresponding to those of the MOS-FETs are used may be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
   a transformer including a primary winding and a secondary winding;
   a primary side circuit that is connected to the primary winding and that includes a switching device intermittently applying a DC voltage to the primary winding;
   a secondary side circuit that includes an inductor connected in series with a current path between a positive output terminal or a negative output terminal and the secondary winding and a first rectifier device and a second rectifier device that rectify a current flowing through the secondary winding and the inductor;
   a first series circuit including a third rectifier device and a fourth rectifier device and that is connected between the positive output terminal and the negative output terminal; and a first capacitor a first end of which is connected to a connection node between the third rectifier device and the fourth rectifier device and a second end of which is connected to a connection node between the first rectifier device and the secondary winding; wherein the first series circuit and the first capacitor define a snubber circuit; and the first rectifier device is connected in series with the secondary winding, and the second rectifier device is connected in parallel with the secondary winding.

2. The switching power supply apparatus according to claim 1, wherein the first rectifier device and the second rectifier device are MOS-FETs each including a body diode.

3. The switching power supply apparatus according to claim 1, wherein the third rectifier device and the fourth rectifier device are diodes.

4. The switching power supply apparatus according to claim 1, wherein the inductor is connected between a source of the first rectifier device and the positive output terminal or the negative output terminal.

5. The switching power supply apparatus according to claim 1, further comprising an input capacitor between a positive input terminal and a negative input terminal of the primary side circuit and an output capacitor between a positive output terminal and a negative output terminal of the secondary side circuit.

6. The switching power supply apparatus according to claim 1, wherein the switching device is a MOS-FET including a body diode.

7. The switching power supply apparatus according to claim 1, wherein each of the switching device, the first rectifier device and the second rectifier device is a MOS-FET including a body diode.

8. The switching power supply apparatus according to claim 1, wherein a first end of the first capacitor is connected to a connection node between the third rectifier device and the fourth rectifier device, and a second end of the first capacitor is connected to a connection node between the second rectifier device and the secondary winding.

9. The switching power supply apparatus according to claim 1, wherein the primary side circuit includes a series circuit of a high-side switching device and a low-side switching device and a series circuit of two capacitors connected between positive and negative terminals.

10. The switching power supply apparatus according to claim 9, wherein the primary winding is connected between a connection node between the high-side switching device and the low-side switching device and a connection node between the two capacitors.

11. The switching power supply apparatus according to claim 1, wherein the secondary winding includes a first secondary winding and a second secondary winding, and the inductor is connected between a connection node between the first secondary winding and the second secondary winding, and an output terminal.

12. The switching power supply apparatus according to claim 11, wherein the first rectifier device is connected in series with the first secondary winding and the second rectifier device is connected in series with the second secondary winding.

13. A switching power supply apparatus comprising:
a transformer including a primary winding and a secondary winding;
a primary side circuit that is connected to the primary winding and that includes a switching device intermittently applying a DC voltage to the primary winding;
a secondary side circuit that includes an inductor connected in series with a current path between a positive output terminal or a negative output terminal and the secondary winding and a first rectifier device and a second rectifier device that rectify a current flowing through the secondary winding and the inductor;
a first series circuit including a third rectifier device and a fourth rectifier device and that is connected between the positive output terminal and the negative output terminal; and
a first capacitor, a first end of which is connected to a connection node between the third rectifier device and the fourth rectifier device and a second end of which is connected to a connection node between the second rectifier device and the inductor; wherein
the first series circuit and the first capacitor define a snubber circuit;
the first rectifier device is a synchronous rectifier device connected in series with the secondary winding and the second rectifier device is a synchronous rectifier device connected in parallel with the secondary winding; and
the first rectifier device and the second rectifier device switch synchronously with the switching device.

14. A switching power supply apparatus comprising:
a transformer including a primary winding and a secondary winding including a first secondary winding and a second secondary winding connected in series with the first secondary winding;
a primary side circuit that is connected to the primary winding and that includes a switching device intermittently applying a DC voltage to the primary winding;
a secondary side circuit that includes an inductor connected in series with a current path between a positive output terminal or a negative output terminal and the secondary winding and a first rectifier device and a second rectifier device that rectify a current flowing through the secondary winding and the inductor;
a first series circuit including a third rectifier device and a fourth rectifier device and that is connected between the positive output terminal and the negative output terminal;
a first capacitor a first end of which is connected to a connection node between the third rectifier device and the fourth rectifier device and a second end of which is connected to an end, not connected to the first series circuit, of the first rectifier device;
a second series circuit that is connected between the positive output terminal and the negative output terminal and that includes a fifth rectifier device and a sixth rectifier device; and
a second capacitor one end of which is connected to a connection node between the fifth rectifier device and the sixth rectifier device and a second end of which is connected to a connection node between the second rectifier device and the second secondary winding; wherein
the first series circuit and the first capacitor define a first snubber circuit;
the second series circuit and the second capacitor define a second snubber circuit; and
the switching device includes a low-side switching device and a high-side switching device that are alternately switched on/off.

15. The switching power supply apparatus according to claim 14, wherein the fifth rectifier device and the sixth rectifier device are diodes.

16. The switching power supply apparatus according to claim 14, wherein each of the third rectifier device, the fourth rectifier device, the fifth rectifier device and the sixth rectifier device is a MOS-FET including a body diode.

* * * * *